US011882795B2

(12) United States Patent
Pike

(10) Patent No.: US 11,882,795 B2
(45) Date of Patent: Jan. 30, 2024

(54) HEMP PREPARATION AND SHUCKING TABLES FOR TRIMMING PLANT MATERIAL

(71) Applicant: Root Origins, Roseburg, OR (US)

(72) Inventor: Eric Pike, Roseburg, OR (US)

(73) Assignee: Eric Pike, Roseburg, OR (US)

( * ) Notice: Subject to any disclaimer, the term of this patent is extended or adjusted under 35 U.S.C. 154(b) by 0 days.

(21) Appl. No.: 17/506,117

(22) Filed: Oct. 20, 2021

(65) Prior Publication Data

US 2022/0117162 A1  Apr. 21, 2022

Related U.S. Application Data

(60) Provisional application No. 63/094,228, filed on Oct. 20, 2020.

(51) Int. Cl.
*A01F 25/14* (2006.01)
*A47B 37/00* (2006.01)
*A47B 83/04* (2006.01)

(52) U.S. Cl.
CPC .............. *A01F 25/14* (2013.01); *A47B 37/00* (2013.01); *A47B 83/045* (2013.01)

(58) Field of Classification Search
CPC ........ A47B 37/00; A47B 83/045; A01F 25/14
See application file for complete search history.

(56) References Cited

U.S. PATENT DOCUMENTS

| | | | | |
|---|---|---|---|---|
| 5,887,878 A | * | 3/1999 | Tisbo | B62B 1/20 280/47.35 |
| 2002/0040667 A1 | * | 4/2002 | Birsel | A47B 21/00 108/25 |
| 2005/0056647 A1 | * | 3/2005 | Cheng | B65D 7/14 220/485 |
| 2007/0056482 A1 | * | 3/2007 | Robinson | A47B 37/04 108/25 |
| 2009/0166991 A1 | * | 7/2009 | Cai | B62B 3/04 280/47.35 |
| 2013/0047895 A1 | * | 2/2013 | Huang | A47B 83/045 108/41 |

* cited by examiner

*Primary Examiner* — Matthew W Ing
(74) *Attorney, Agent, or Firm* — Thomas | Horstemeyer, LLP

(57) ABSTRACT

Various examples of a system for trimming and collecting plant material are described herein. In one aspect, the system can include a first and second workstation. The first workstation can include a first support frame and a containment portion. The containment portion may include a sidewall and a planar screen. The planar screen removably positioned at an angle within the sidewall. The second workstation can include a second support frame, a table portion, at least one drawer having a bottom may include a screen, and at least one bin. The table portion can include a planar screen table surface and a containment wall. The at least one drawer can be positioned between the planar screen table surface and the at least one bin, where the planar screen table surface can include a screen having openings sized greater than the screen of the bottom of the at least one drawer.

12 Claims, 13 Drawing Sheets

HEMP PREPARATION AND SHUCKING TABLES FOR TRIMMING PLANT MATERIAL

CROSS-REFERENCE TO RELATED APPLICATION

This application claims the benefit of and priority to U.S. Provisional Application No. 63/094,228, titled "HEMP PREPARATION AND SHUCKING TABLES FOR TRIMMING PLANT MATERIAL," filed on Oct. 20, 2020, the contents of which are hereby incorporated herein by reference in its entirely.

BACKGROUND

The hemp plant has many industrial and medicinal uses. Since the enactment of the 2014 Farm Bill, hemp crops can be grown in the USA, starting a new paradigm in products and how products are manufactured and serviced.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

A system for trimming and collecting plant material is disclosed herein. While hemp is used as an example crop that can be processed, the system for trimming and collecting plant material can be relied on for other agricultural crops.

Figure 1:
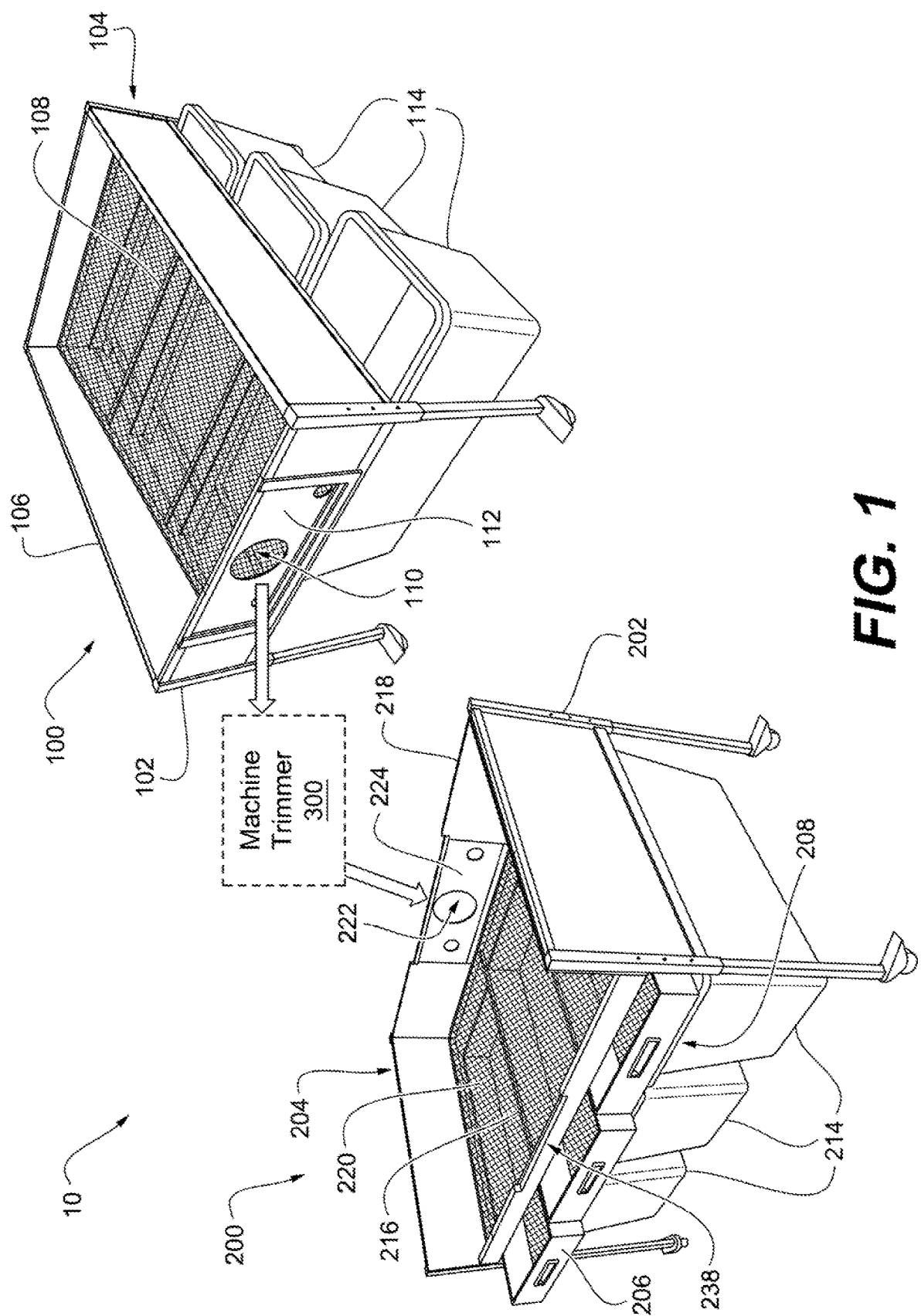
FIG. 1 illustrates an example of a system for trimming and collecting plant material according to various embodiments described herein.

As shown in FIG. 1, the system for trimming and collecting plant material 10 comprises a preparation workstation 100 and a finish workstation 200 for processing a plant. In some examples, the preparation workstation 100 can be used alone to prepare a plant for process. In some examples, the finish workstation 200 can be used alone to finish processing a plant. In some examples, the preparation workstation 100 and the finish workstation 200 can be connected directly such that the flower that has been shocked is moved from the preparation workstation 100 and the finish workstation 200. In some examples, a machine trimmer 300 can be detachably connected between the preparation workstation 100 and the finish workstation 200 to aid in moving a portion of the plant material from the preparation workstation 100 and the finish workstation 200.

The preparation workstation 100 can include a first support frame 102 and a containment portion 104. The containment portion 104 can include a sidewall 106 and a planar screen 108. The planar screen 108 can be removably positioned at an angle within the sidewall 106. For example, the angle can be configured for the size of the containment portion 104 such that there is a tilt in the planar screen 108 to direct the plant biomass toward an outlet hole 110 in the sidewall 106 of the preparation workstation 100. In some examples, a removable panel 112 can comprise the outlet hole 110. For example, the outlet hole 110 in the removable panel 112 or the sidewall 106 can be configured to interface with a machine trimmer. In some examples, the removable panel 112 can be configured to with one or more holes to connect with a specific machine trimmer 300 provided. For example, the removable panel can be configured to interface with trimmer machines such as MOBIUS, KEIRTON MODELS—T2, T4, CENTURION, and the like. More than one removable panel can be provided. For example, the outlet hole can have a diameter of about 4 to about 8 inches. The planar screen 108 of the preparation workstation 100 can have openings of about 0.3 to 0.6 inches. For example, the openings of the planar screen 108 can be about 0.5 inches. The preparation workstation 100 can include at least one container or bin 114 mounted below the planar screen 108

The finish workstation 200 of the system for trimming and collecting plant material 10 can include a second support frame 202, a table portion 204, at least one drawer 206 having a bottom 208 may include a screen 210, and at least one bin 214. The table portion 204 can include a planar screen table surface 216 and a containment wall 218. The at least one drawer 206 can be positioned between the planar screen table surface 216 and the at least one bin 214, where the planar screen table surface 216 can include a screen 220 having openings sized greater than the screen 210 of the bottom 208 of the at least one drawer 206. For example, the screen of the planar screen table surface 216 can have openings ranging from about 0.4 to about 0.6 inches. The screen of the bottom of the at least one drawer 206 can have openings ranging from about 0.15 to about 0.35 inches. In an example, the screen 220 of the planar screen table surface has openings of about 0.5 inches and the screen 210 in the bottom of the at least one drawer has openings of about 0.25 inches.

The containment wall 218 of the finish workstation 200 can include an inlet hole 222. In some examples, a removable panel 224 can comprise the inlet hole 222. For example, the inlet hole 222 in the removable panel 224 or the containment wall 218 can be configured to interface with a machine trimmer 300. For example, the inlet hole 222 can have a diameter of about 4 to about 8 inches. In some examples, the removable panel 224 can be configured to with one or more holes to connect with a specific machine trimmer 300 provided. For example, the removable panel can be configured to interface with a specified trimmer machine such as MOBIUS, KEIRTON MODELS—T2, T4, CENTURION, and the like. More than one removable panel can be provided. In some examples, system for trimming and collecting plant material 10 can be used without a machine trimmer 300. In some examples, the system for trimming and collecting plant material 10 is configured such that the preparation workstation 100 and the finish workstation 200 are positioned such that the outlet hole 110 of the preparation workstation 100 is positioned to abut the inlet hole 222 of the finish workstation 200. When a machine trimmer 300 is used, the machine trimmer 300 can receive input via the outlet hole 110 of the preparation workstation 100 and the finish workstation 200 can receive output from the machine trimmer 300 via the inlet hole 222.

Figure 2:
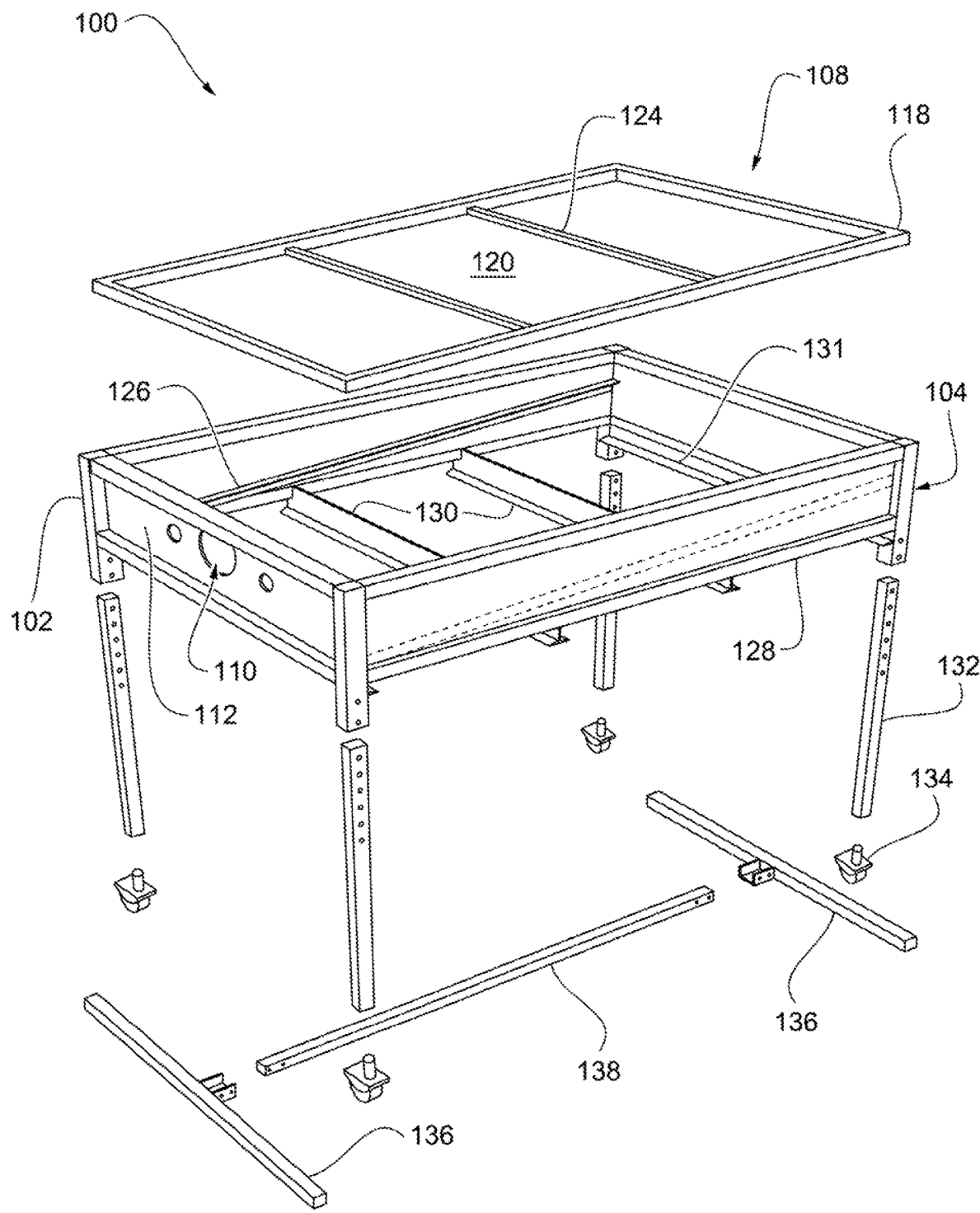
FIG. 2 illustrates an exploded view of an example of a preparation workstation of the system for trimming and collecting plant material of FIG. 1 according to various embodiments described herein.
Figure 3:
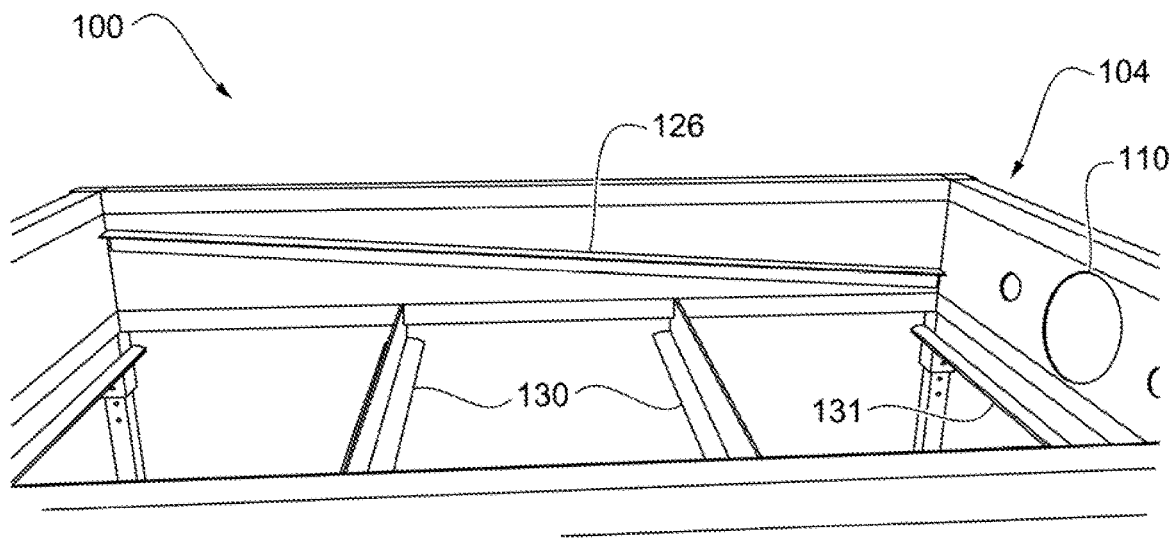
FIG. 3 illustrates an example of the interior of the containment portion of the preparation workstation of FIG. 2 according to various embodiments described herein.
Figure 8:
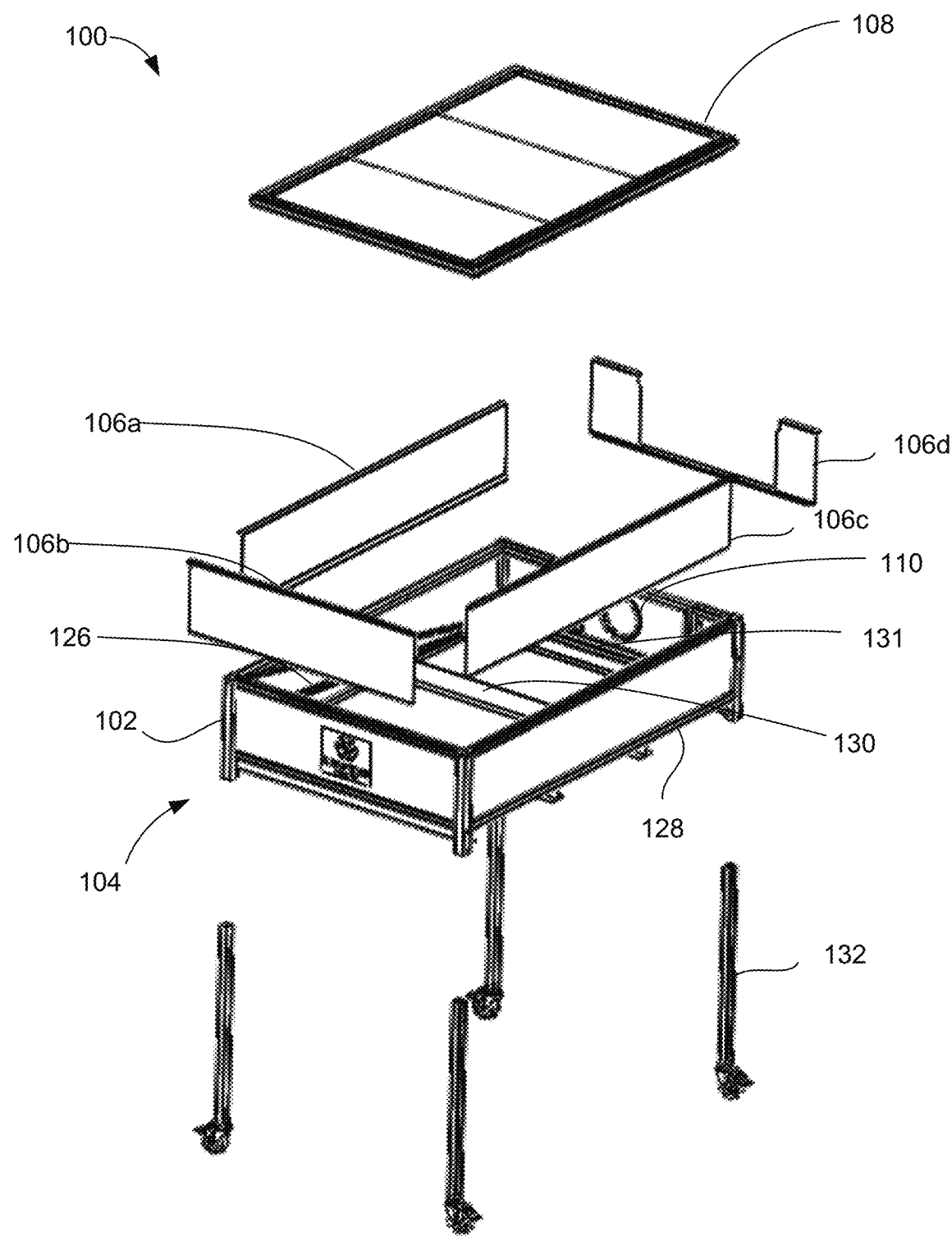
FIG. 8 illustrates an exploded view of an example preparation workstation of the system for trimming and collecting plant material according to various embodiments described herein.
Figure 9A:
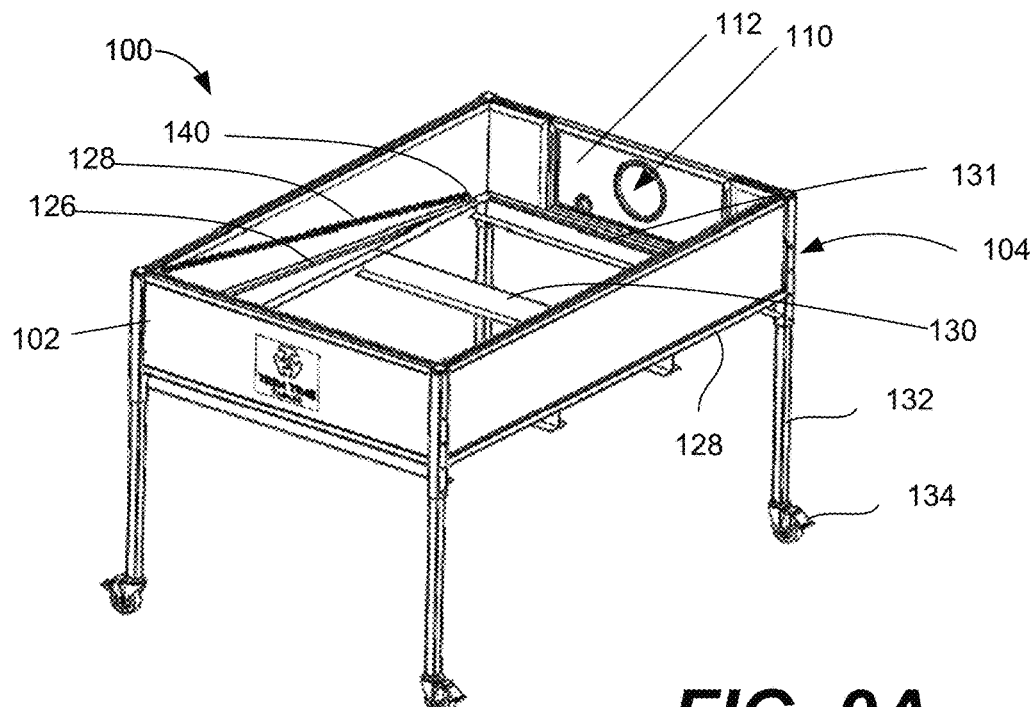
FIGS. 9A and 9B illustrate a perspective view (FIG. 9A) and a front view (FIG. 9B) of an example preparation workstation of the system for trimming and collecting plant material according to various embodiments described herein.
Figure 9B:
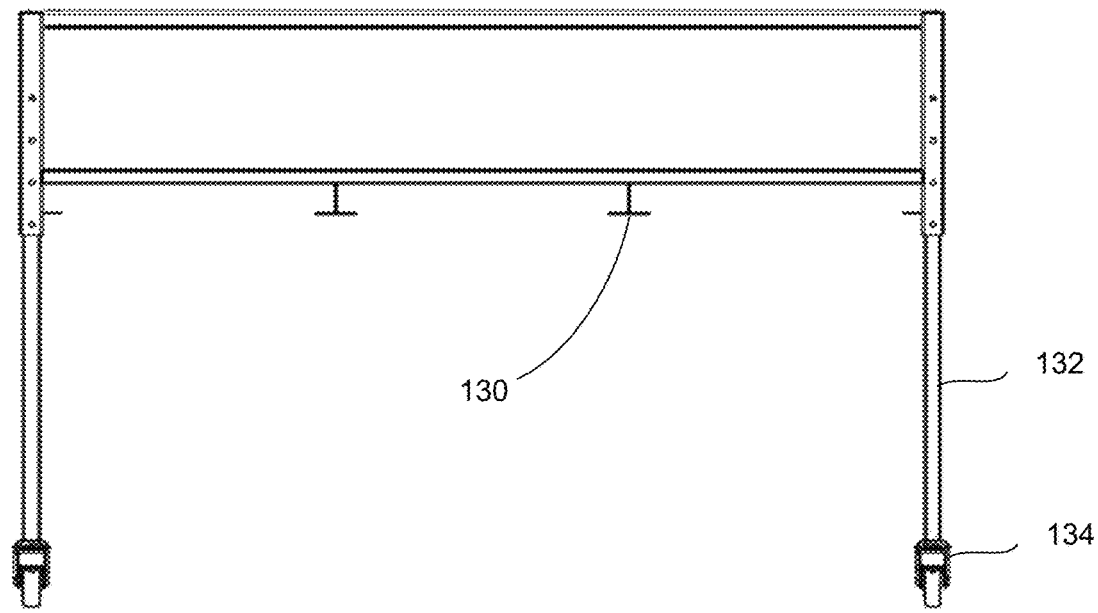
Figures 10A, 10B:
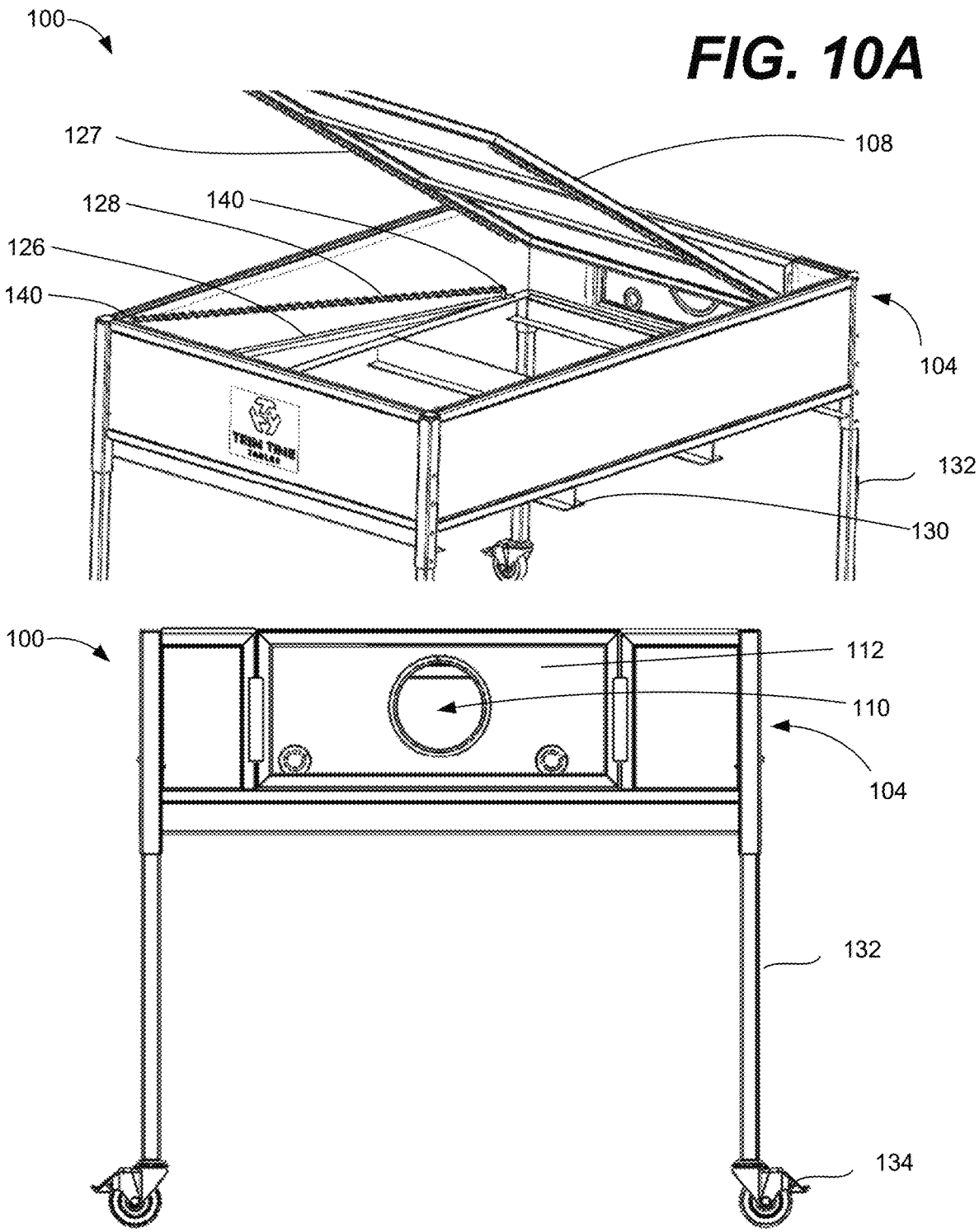
FIGS. 10A and 10B illustrate a perspective view (FIG. 10A) and a rear view (FIG. 10B) of an example preparation workstation of the system for trimming and collecting plant material according to various embodiments described herein.

FIG. 2 illustrates an exploded view of preparation workstation 100 can be used at the beginning phase of product sorting of hemp. The preparation workstation 100 comprises a first support frame 102, a containment portion 104 having a sidewall 106, and a planar screen 108. The planar screen 108 can comprise a frame 118 and wire mesh 120. In some examples, the frame 118 of planar screen 108 comprises a perimeter frame. In some examples, the frame 118 of planar screen 108 further comprises support sections 124. The planar screen 108 can be received within the sidewall 106 and supported by a pair of rails 126 configured such that the planar screen 108 is tilted at an angle toward the outlet hole 110 of the containment portion 104, as shown in FIG. 3. In some examples, the angled slope is configured to have the material continue down to the outlet hole 110 to the machine trimmer 300. For example, the planar screen 108 can be positioned at an angle of about 2 to about 15 degrees. For example, the angle can be about 4 degrees. The sidewall 106 and planar screen 108 of the containment portion 104 can be made from stainless steel. In some examples, the sidewall 106 can be continuous. In some examples, the sidewall can comprise a plurality of panels 106a-106d (FIG. 8).

The first support frame 102 can comprise a perimeter structure 128 to support the containment portion 104. In some examples, the perimeter structure 128 can also include one or more cross support sections 130. In some examples, the one or more cross support sections 130 can define an area through which the one or more bins 114 of the preparation workstation 100 can receive plant material. In some examples, the one or more cross support sections 130 have an inverted T-shape and can be configured to slidably receive the one or more bins 114. Additionally, side support brackets 131 can be mounted within the perimeter structure 128 to secure slots to receive the bins on both sides of a bin 114. The support frame, including the one or more cross support sections 130, and the one or more bins can be configured to secure the weight of fallen plant material, even if a bin is completely filled.

Figure 4:
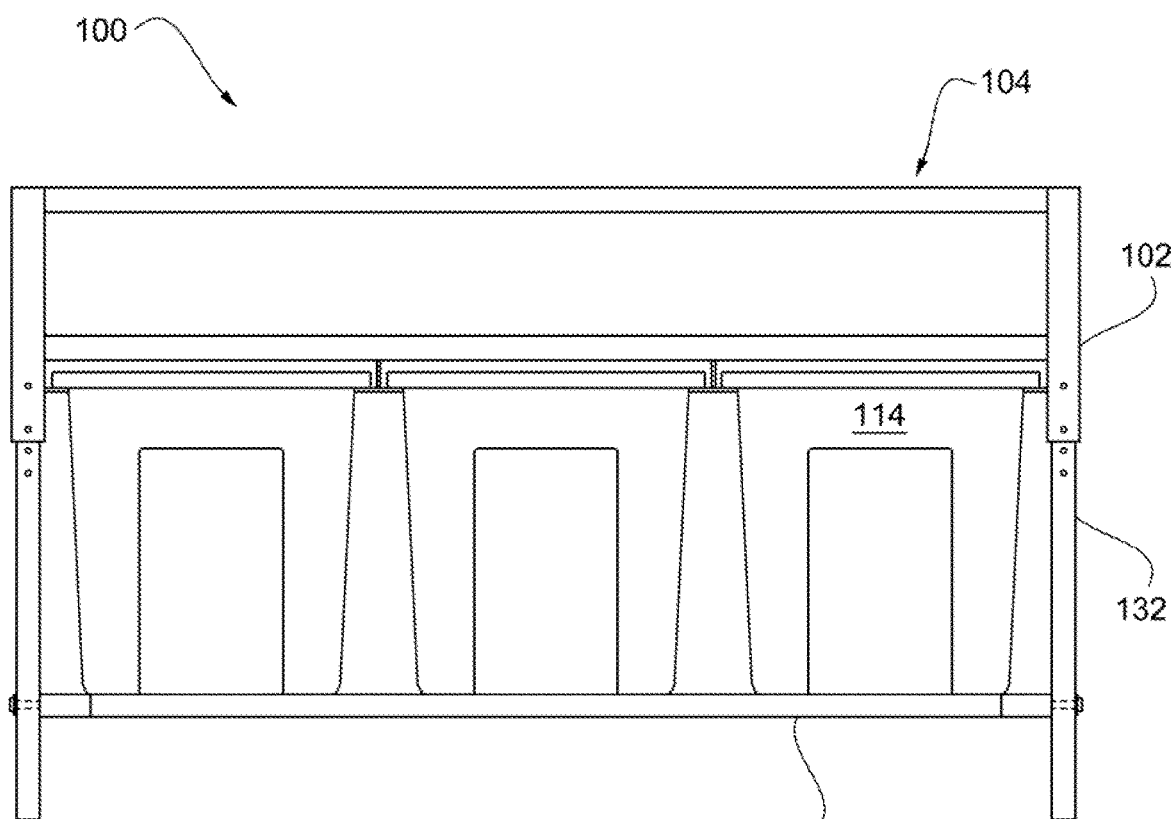
FIG. 4 illustrates a front view of the preparation workstation of FIG. 2 according to various embodiments described herein.

The support frame 102 can further comprise a plurality of legs 132. In some examples, the plurality of legs are adjustable to change the height of the containment portion 104. For example, a leg can have tubular sections where one section of a leg slides within the other, where the height can be adjusted by positioning a pin in on of a plurality of holes. In some examples, the support frame 102 can further comprise a plurality of wheels 134, each wheel attached to a leg of the plurality of legs 132. In some examples, one or more support braces 136 can be installed to attach two legs of the plurality of legs. In some examples, a central brace 138 can attach two support braces 136. In some examples, the one or more bins can rest or come in contact with the central brace 138, as shown in FIG. 4. In some examples, the support braces and/or central brace are omitted.

Figure 5:
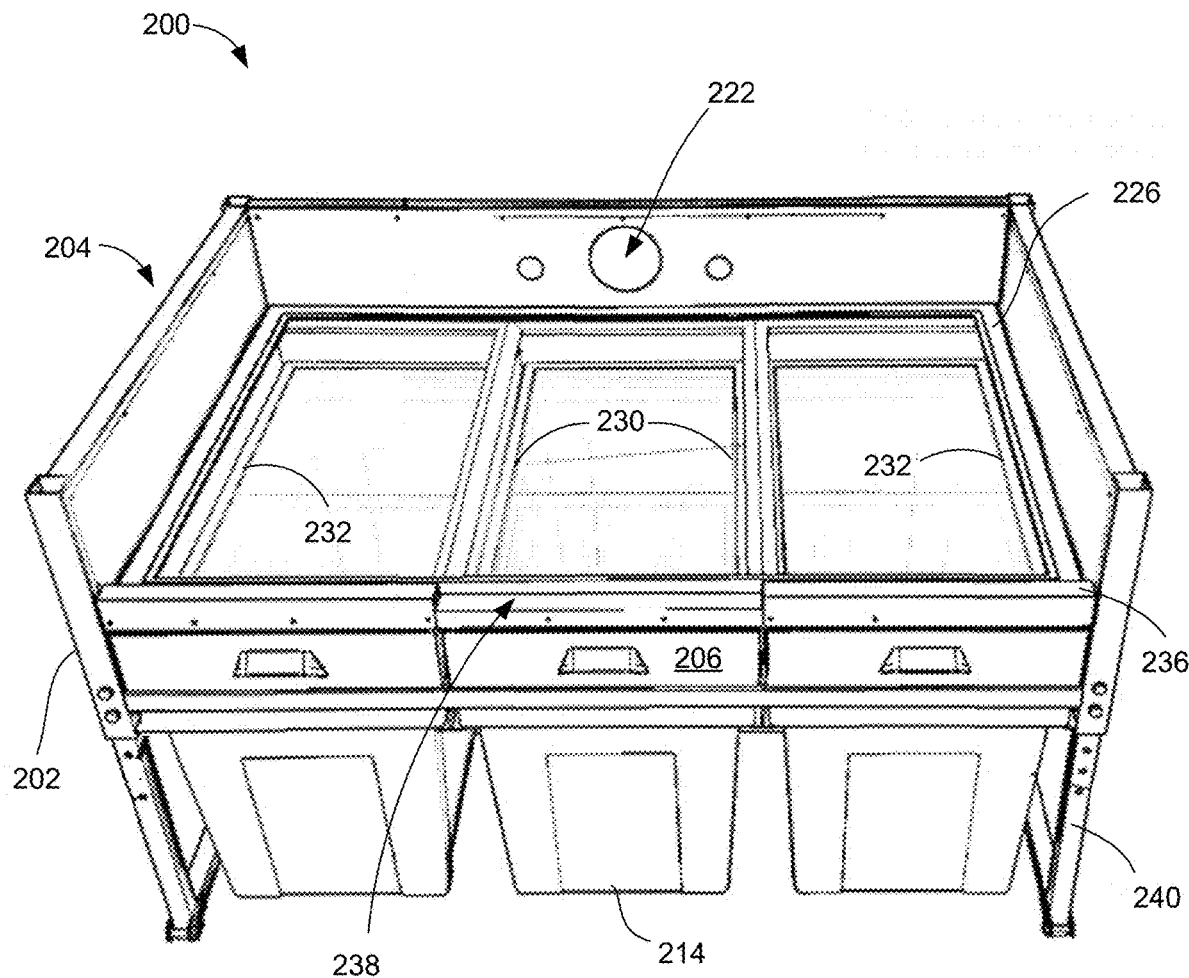
FIG. 5 illustrates a perspective view of an example finish workstation of the system for trimming and collecting plant material of FIG. 1 according to various embodiments described herein.
Figure 6:
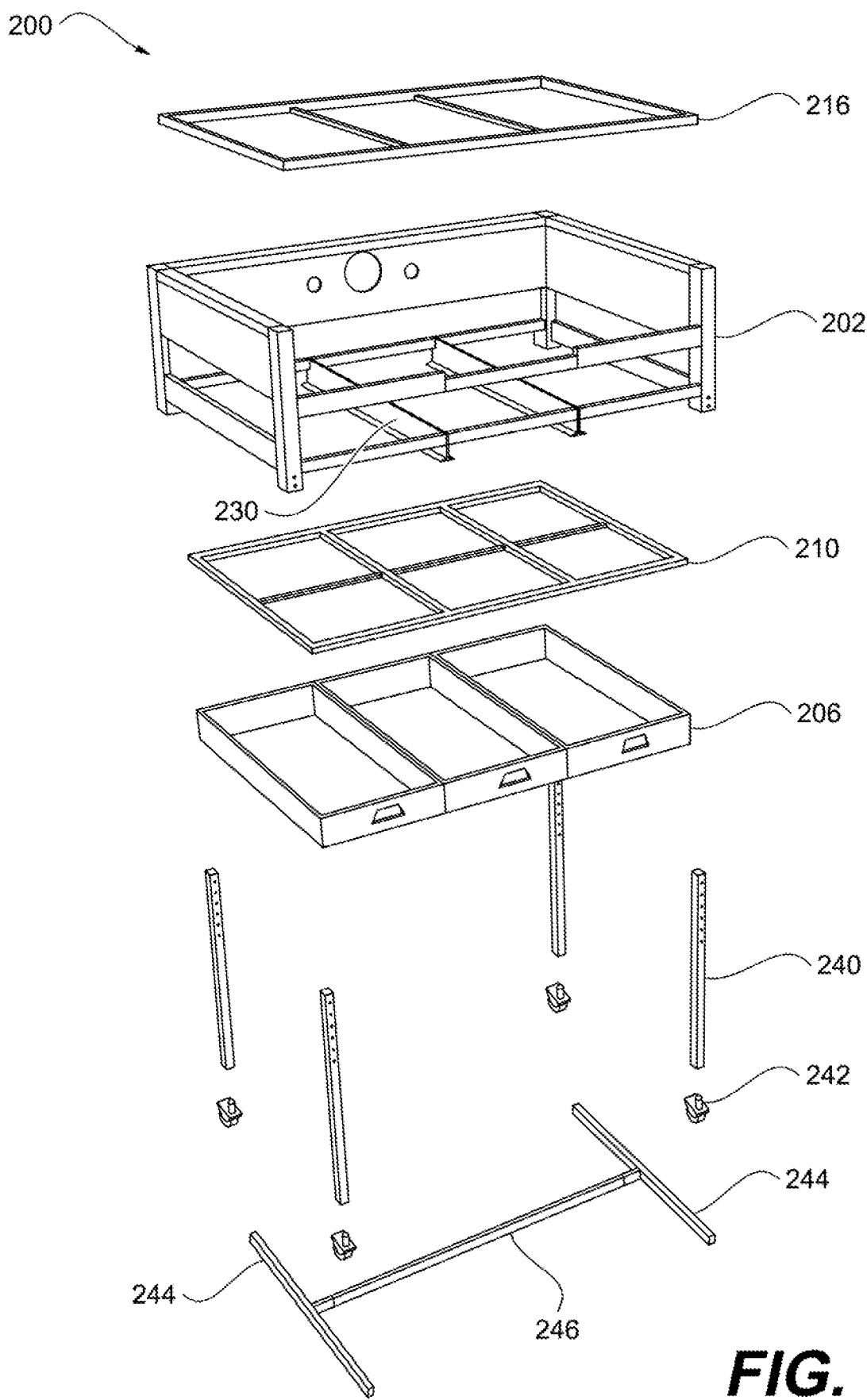
FIG. 6 illustrates an exploded view of an example finish workstation of FIG. 5 according to various embodiments described herein.

As shown in FIGS. 5 and 6, the finish workstation 200 can include a second support frame 202, a table portion 204, at least one drawer 206 having a bottom 208 that may include a screen 210, and at least one bin 214. The table portion 204 can include a planar screen table surface 216 and a containment wall 218. The at least one drawer 206 can be positioned between the planar screen table surface 216 and the at least one bin 214, where the planar screen table surface 216 can include a screen 220 having openings sized greater than the screen of the bottom of the at least one drawer 206. The screen 220 of the planar screen table surface 216 can have openings ranging from about 0.4 to about 0.6 inches. The screen 210 of the bottom 208 of the at least one drawer 206 has openings ranging from about 0.15 to about 0.35 inches. The screen 220 of the planar screen table surface 216 has openings of about 0.5 inches and the bottom 208 of the at least one drawer 206 has openings of about 0.25 inches. The drawers 206 are configured to capture smaller flowers that fall through the planar screen table surface 216.

Figure 7A:
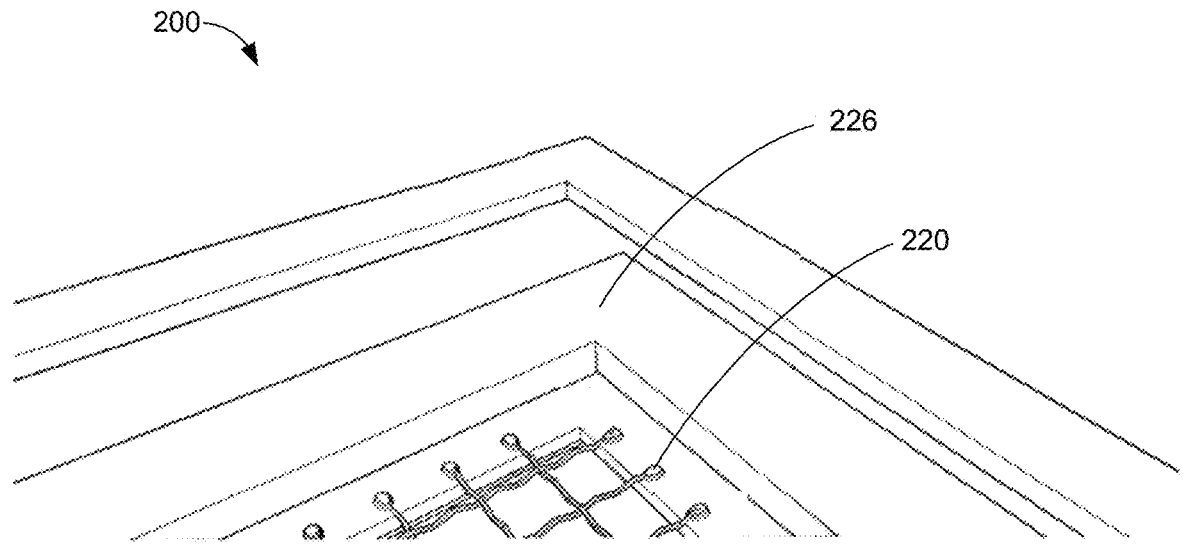
FIGS. 7A and 7B illustrate wire mesh mounted as a planar screen table surface of the example finish workstation of FIG. 5 according to various embodiments described herein.
Figure 7B:
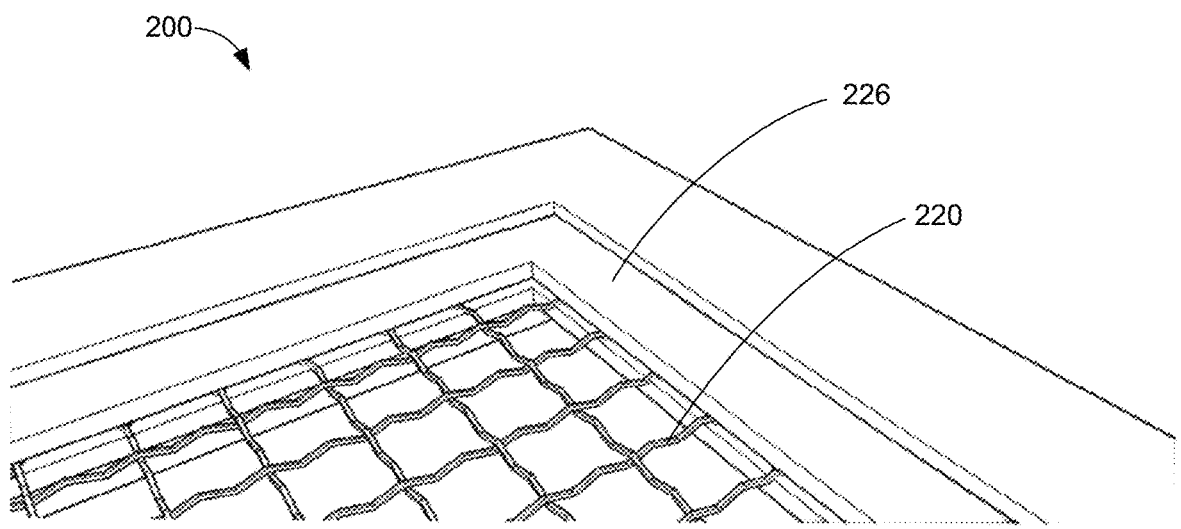

For example, FIGS. 7A and 7B illustrate the mesh screen 220 mounted in a frame 226 for the planar screen table surface 216 of the finish workstation 200. Although not shown, the mesh screen 120 can be mounted in a frame 118 for the planar screen 108 of the preparation workstation 100 in a similar manner. Similarly, the mesh screen 210 can mounted in the bottom 208 of a drawer 206 can also be mounted within a frame in the bottom. In some examples, the mesh screen can be welded or mounted by other means within the frame such that a portion of the frame is on either side of the planar screen table such that any welds are covered so that plant materials are blocked from collecting at the edges.

The finish workstation 200 can have dimensions similar to the preparation workstation 100. In some examples, the support frame 202 of the finish workstation 200 can have the same dimensions and configuration as the preparation workstation 100. Similar to the preparation workstation 100, the finish workstation 200 can have one or more cross support sections 230 to define an area through which the one or more bins 214 of the finish workstation 200 can receive plant material. In some examples, the one or more cross support sections 230 have an inverted T-shape and can be configured to slidably receive the one or more bins 214. Additionally, side support brackets 232 can be mounted within the support frame 202 to secure slots to receive the bins on both sides of a bin 214. The support frame, including the one or more cross support sections 230, and the one or more bins can be configured to captures the loose plant material that falls through the screen in the bottom of the at least one drawer 206. The configuration can secure the weight of fallen plant material, even if a bin is completely filled, so that it does not touch the floor.

Figure 12A:
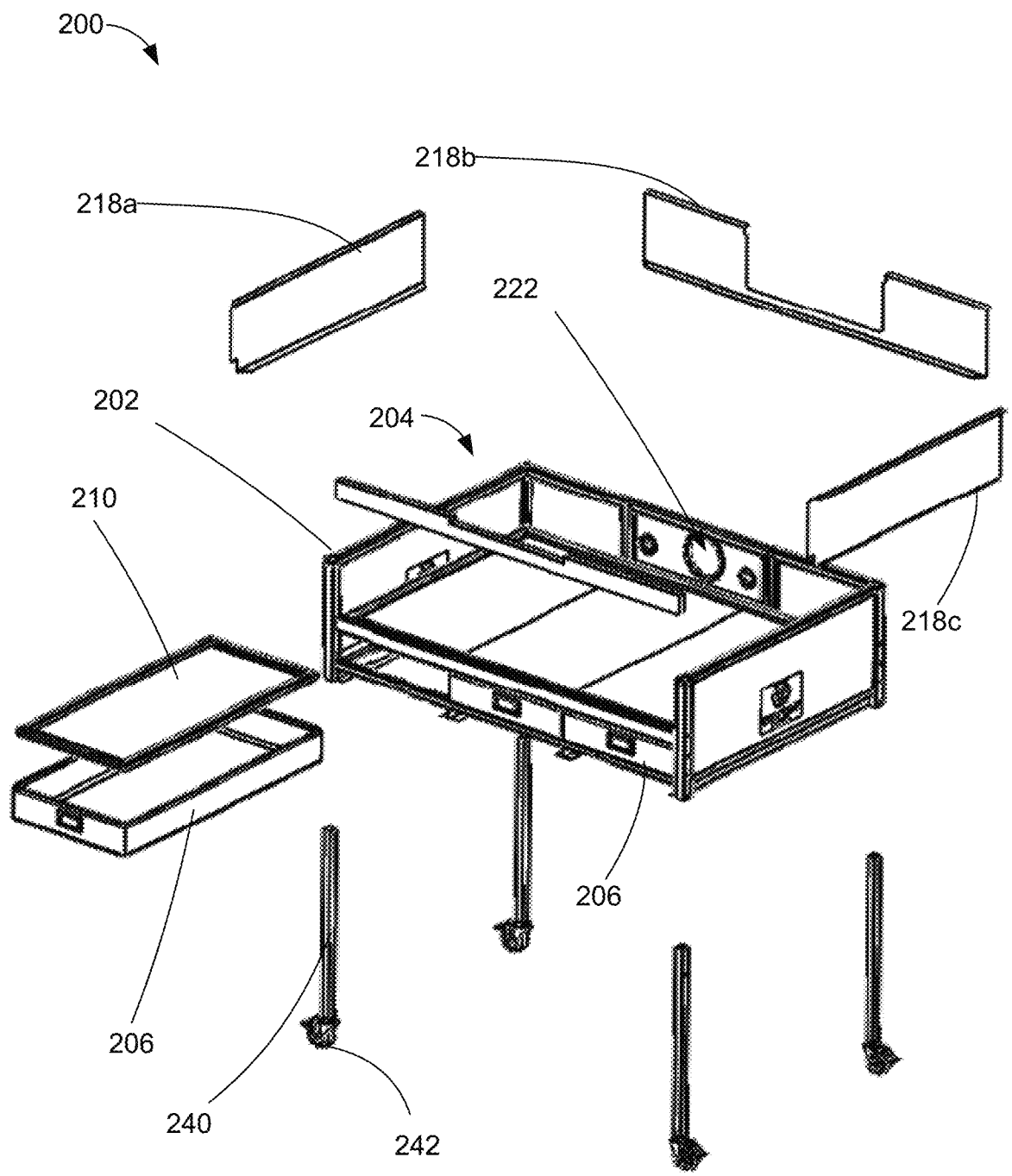
FIGS. 12A and 12B illustrate a perspective view (FIG. 10A) and a rear view (FIG. 12B) of an example finish workstation of the system for trimming and collecting plant material according to various embodiments described herein.
Figure 12B:
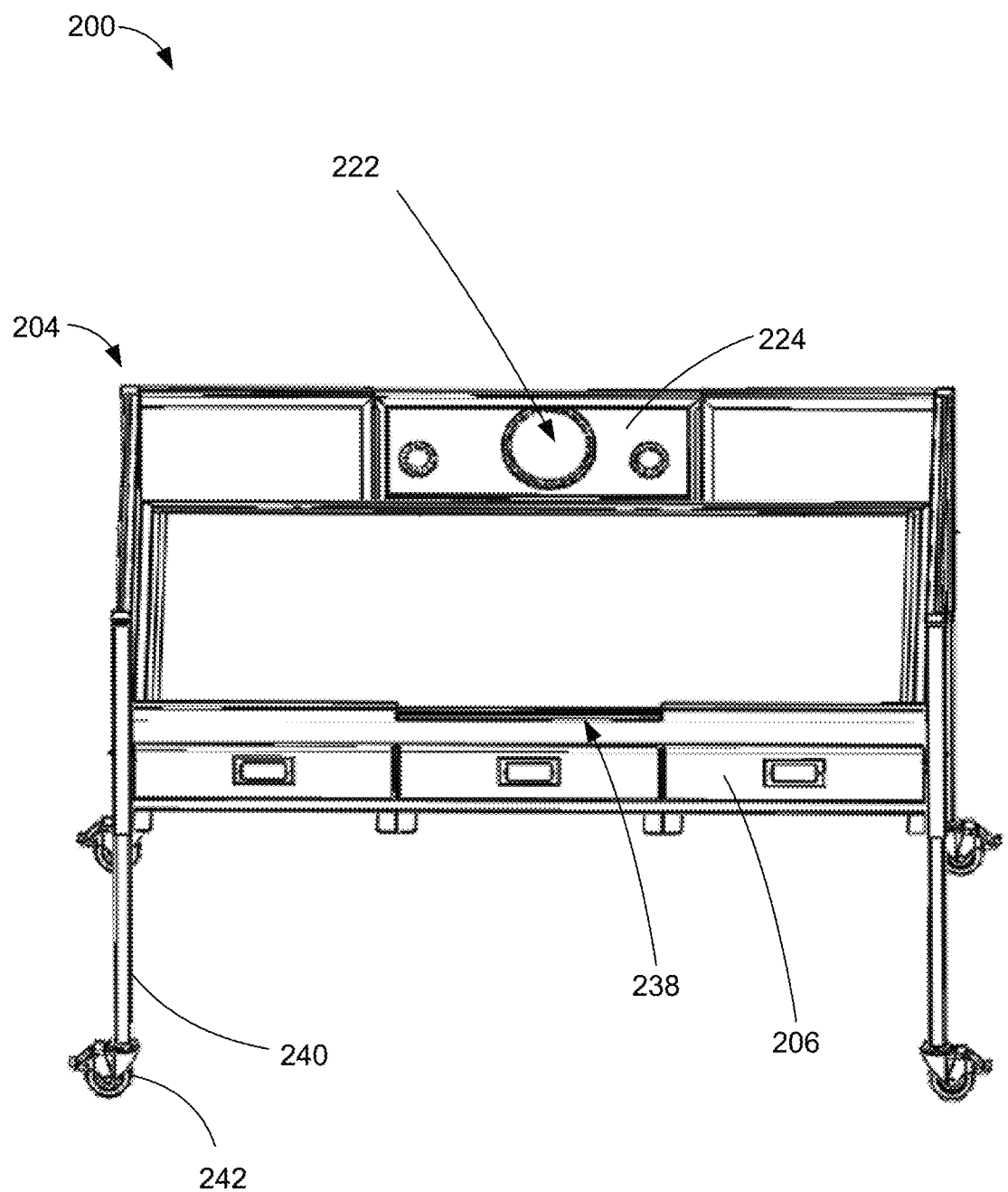

Since the finish workstation 200 has a planar screen table surface 216 that is substantially horizontal and/or parallel to the ground, the containment wall 218 on one side is reduced to a lip 236 for easier access. For example, the lip can also include at least a portion with a lower ledge opening 238 configured to scoop materials off the table. An inlet hole 222 can be in the containment wall 218 opposite the side with the lip 236. For example, the inlet hole 222 can be configured to manually receive plant material from the preparation table via the inlet hole 222. In other examples, a machine trimmer 300 can be positioned between the preparation workstation 100 and the finish workstation 200, such that the machine trimmer 300 receives plant material from the preparation workstation 100, processes the plant material, and transfers the plant material via the inlet hole 222 to the finish workstation 200. The containment portion 104 of the preparation workstation 100 and the table portion of the finish workstation can be made from stainless steel. In some examples, the sidewall 218 can be continuous. In some examples, the sidewall can comprise a plurality of panels 218a-218c (FIG. 12).

In some examples, the support frame 202 of the finish workstation 200 can have the same dimensions and configuration as the preparation workstation 100. The support frame 202 can further comprise a plurality of legs 240. In some examples, the plurality of legs are adjustable to change the height of the table portion 204. For example, a leg can have tubular sections where one section of a leg slides within the other, where the height can be adjusted by positioning a pin in on of a plurality of holes. In some examples, the support frame 202 can further comprise a plurality of wheels 242, each wheel attached to a leg of the plurality of legs 240. In some examples, one or more support braces 244 can be installed to attach two legs of the plurality of legs. In some examples, a central brace 246 can attach two support braces 244. In some examples, the one or more bins 214 can rest or come in contact with the central brace 246. In some examples, the support braces and/or central brace are omitted.

Figure 11:
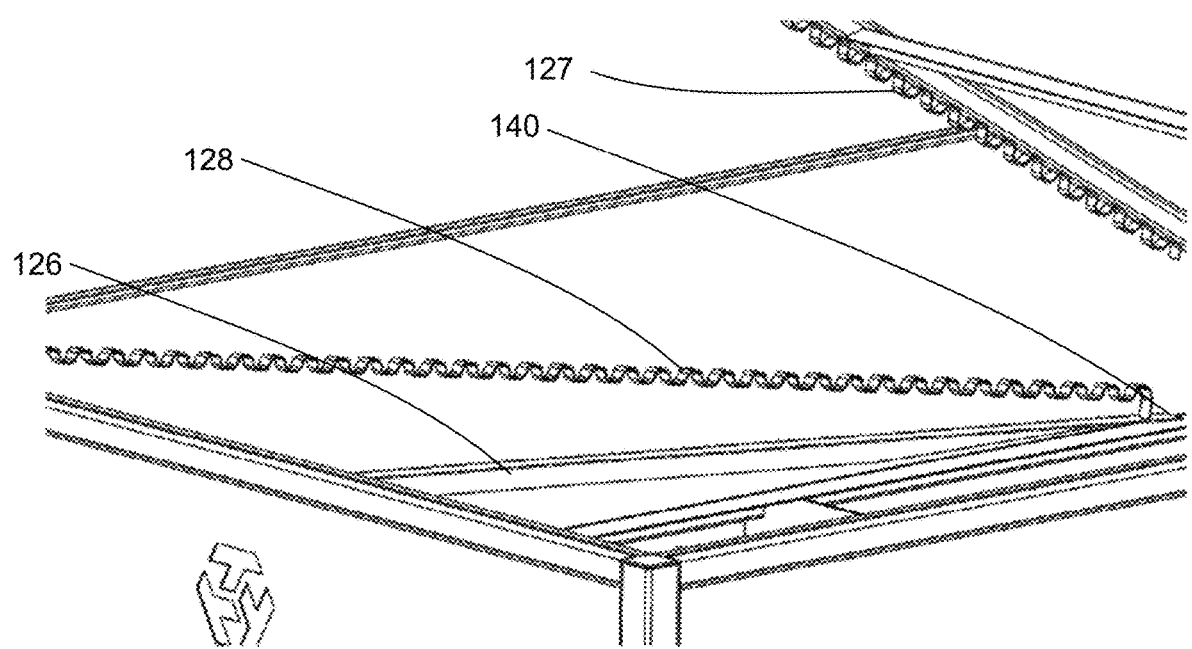
FIG. 11 illustrates the use of ripple strips in an example preparation workstation of the system for trimming and collecting plant material according to various embodiments described herein.

In some examples, the planar screen 108 of the preparation workstation 100 includes a screen ripple strip 127 attached to lower surface configured to contact a table ripple strip 128 attached to the rails 126 and positioned to create an up-and-down and side-to-side motion while the screen 108 is being pulled out, as shown in FIG. 11A. In some embodiments, the table ripple strip 128 is attached to the rails 126 at an attachment point 140 at the rear of the preparation workstation 100 and at another attachment point 140 positioned at or near the top of the first support frame 102 such that the screen 108 can slide along the table ripple strip 128 and clear the top surface of the first support frame 102.

Figures 13A, 13B:
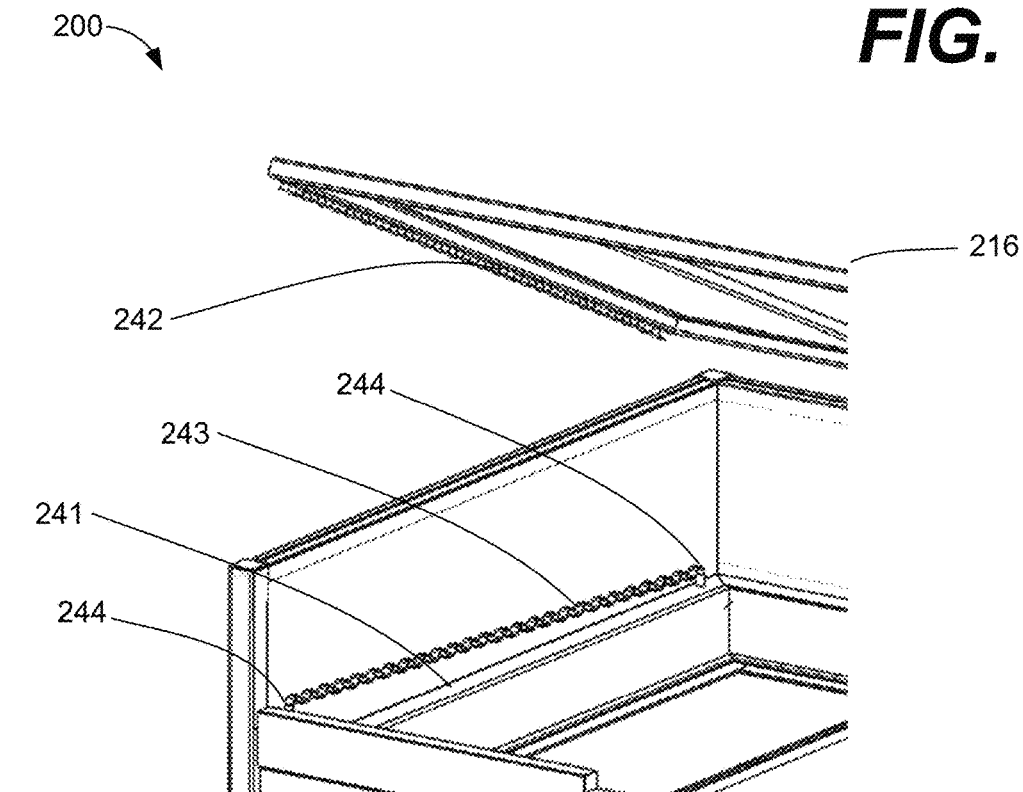
FIG. 13A illustrates the use of ripple strips in an example preparation workstation of the system for trimming and collecting plant material according to various embodiments described herein.
FIG. 13B illustrates a perspective view of an example finish workstation of the system for trimming and collecting plant material according to various embodiments described herein.

The planar screen table surface 216 can be supported by a pair of rails 241 configured such that the planar screen table surface 216 is tilted at an angle toward the inlet hole 222. The planar screen table surface 216 can in some examples also include on its lower surface a ripple metal strip 242 configured to contact table ripple strip 243 attached to the rails 241 and positioned to create an up-and-down and side-to-side motion while the screen 216 is being pulled out, as shown in FIG. 13A. In some embodiments, the table ripple strip 243 is attached to the rails 241 at an attachment point 244 at the rear of the finish workstation 200 and at another attachment point 140 positioned at the front such that the screen 216 can slide along the table ripple strip 243 as shown in FIG. 13B.

By pulling the screen out from the table, the screen runs across the top/bottom rippled strip, creating a vibrating motion. In the case of the preparation workstation 100, this can provide a rattling effect, dislodging any excess product stuck or grouped together, such that the loose material will fall into the bins 114. In the case of the finish workstation 200, this can provide a rattling effect, dislodging any excess product stuck or grouped together, such that all the smaller product will fall into the drawers 206 below and the smallest material into the bins 214. In some examples, the ripple strips are removable to allow the screens to lay flat. For example, in some examples, the attachment points 140, 244 are fitted slots. For example, the slots can be ⅛ in width and 0.40 inches long, and the ripple strips can be 0.60 inches wide at its end points. The ripple strips can therefore be secured essentially by all four walls of the table for managing support.

One general aspect includes a method for trimming and collecting plant material. The method can include receiving a dry biomass of a plant onto a planar screen of a first workstation. The method can also include separating a portion of the dry biomass smaller than a selected size into the containers mounted below the planar screen, where the planar screen of a first workstation has a metal wire mesh mounted within a frame, and the metal wire mesh has openings of the selected size. The method can also include advancing a portion of the biomass of equal or greater than a selected size to a second workstation.

In some examples, the method may include: receiving the portion of the biomass of equal or greater than the selected size onto a planar screen table surface of the second workstation; separating the portion of biomass by a planar screen table surface having a first screen with openings of a first size; receiving a first separated portion into at least one drawer of the second workstation, the at least one drawer having a second screen with openings of a second size, where the second size is less than the first size. Receiving the portion of the biomass of equal or greater than the selected size may include receiving the portion of the biomass from a machine trimmer.

For example, the plant material on the preparation workstation can be fed into the trimmer that is set up in the between the preparation and finish workstations. The trimmed flower (finished material) can be ejected out of the trimmer machine onto the finish table surface of the finish workstation through the inlet hole of the removable panel. If the flower needs additional touch up, it is handled on the table, and excess trim can drop into the bins below, without hitting the ground thus can be used for multiple applications.

In an example, the preparation workstation 100 can be is a high table that has an angled 0.25 inch mesh screen. It is angled to push material towards the machined trimmer, it starts high on one side and slants at an angle of about 4 degrees to the other end. The dry biomass of hemp can be deposited onto the screened table. Underneath there are channels of steel sliders 130, 131 that allow plastic bins to fit side by side and slide in. The bins 114 can capture the smaller products. Every part of the plant is important to secure a cleaner facility and also material used to produce additional future products. At the end of the slanted table downward there are three holes, one large one and two smaller ones. The three holes are to secure trimmer to attach as potential manual conveyer.

The finish workstation 200 can be used to capture the finished material as it exits the trimmer or can receive plant material after another machine has serviced part of the trimming. It also has three holes—one large hole to secure the output of the exit material. The exit table can be rectangular with a longer width to secure more output material. The finish workstation 200 includes two layers of screens: a screen 220 in the planar screen surface 216 and drawer screens 210. For example, the first screen 220 can be a 0.5 inch screen, or a screen with openings of about 0.5 inches. As shown in the example in FIGS. 1, 5, and 6, directly underneath the first screen 220 are three drawers 206 with screens 210 for bottoms. For example, the drawer screens 210 can be a 0.25 in screen, or a screen with openings of about 0.25 inches. As material comes out of the trimmer, they come in different sizes. The two levels of screens capture all sizes of materials. Below the screened drawers 206 are also rails 230, 232 to secure the slide in of bins 214. The bins are to secure any remaining products for future use and maintain clean stations.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A system, comprising:
    a first workstation comprising a first support frame and a containment portion, the containment portion comprising a sidewall and a planar screen, the planar screen removably positioned at an angle of about 2 to about 15 degrees within the sidewall; and
    a second workstation comprising a second support frame, a table portion, at least one drawer having a bottom comprising a screen, and at least one bin, the table portion comprising a planar screen table surface and a containment wall, the at least one drawer positioned between the planar screen table surface and the at least one bin, wherein the planar screen table surface comprises a screen having openings sized greater than the screen of the bottom of the at least one drawer, and
    a machine trimmer positioned between the first workstation and the second workstation such that the machine trimmer receives input via the outlet hole of the first workstation, and
    wherein the second workstation is configured to receive receives output from the machine trimmer via the inlet hole.

2. The system of claim 1, wherein the sidewall of the first workstation comprises an outlet hole and the containment wall of the second workstation comprises an inlet hole.

3. The system of claim 1, wherein the sidewall of the first workstation comprises a removable panel comprising the outlet hole and the containment wall of the second workstation comprises a removable panel comprising the inlet hole, wherein the removable panel is configured to interface with a specified machine trimmer.

4. The system of claim 1, wherein the screen of the planar screen table surface has openings ranging from about 0.4 to about 0.6 inches.

5. The system of claim 1, wherein the screen of the bottom of the at least one drawer has openings ranging from about 0.15 to about 0.35 inches.

6. The system of claim 1, wherein the screen of the planar screen table surface has openings of about 0.5 inches and the bottom of the at least one drawer has openings of about 0.25 inches.

7. The system of claim 1, wherein planar screen of the first workstation has openings of about 0.3 to about 0.6 inches.

8. The system of claim 1, wherein the first support frame or the second support frame has adjustable legs.

9. The system of claim 1, wherein the first support frame or the second support frame further comprise wheels.

10. The system of claim 1, wherein the planar screen of the first workstation comprises a frame and a metal wire mesh mounted within the frame.

11. The system of claim 1, wherein the planar screen table surface of the second workstation comprises a frame and a metal wire mesh mounted within the frame.

12. The system of claim 1, wherein containment wall of the second workstation comprises a lip configured to reversibly receive the planar screen table surface.

* * * * *